Jan. 24, 1961
C. E. GRIMES
2,968,906
LAWN MOWER ROLLER AND SUPPORT
Filed Sept. 8, 1958
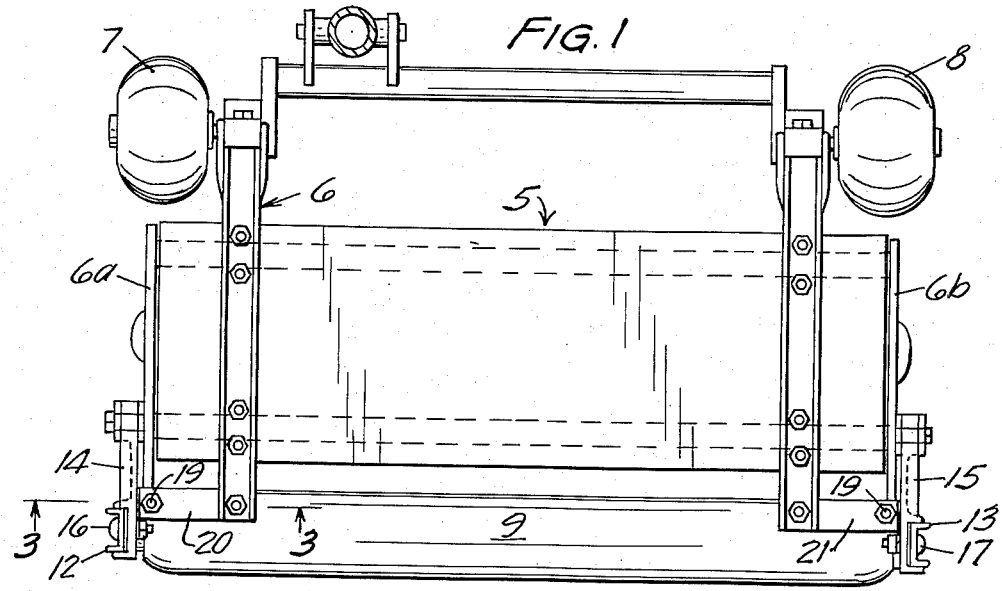
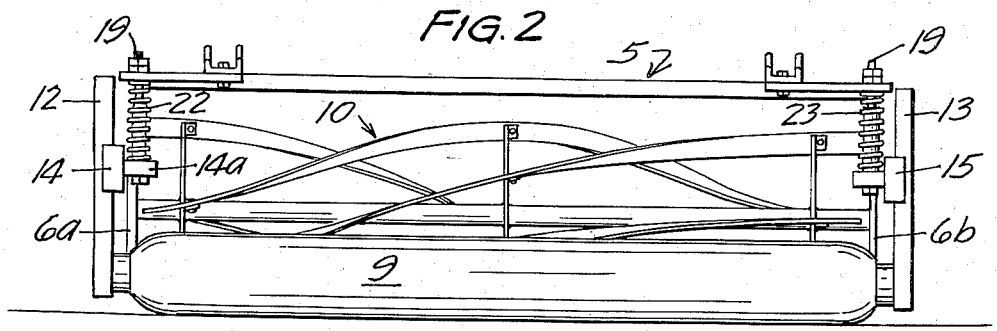
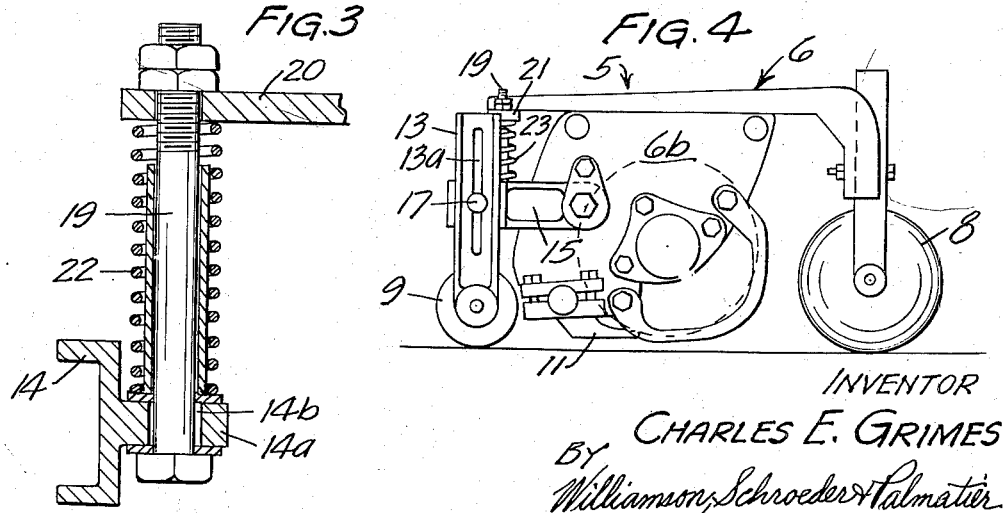
INVENTOR
CHARLES E. GRIMES
BY Williamson, Schroeder & Palmatier
ATTORNEYS United States Patent Office 2,968,906
Patented Jan. 24, 1961

2,968,906

LAWN MOWER ROLLER AND SUPPORT

Charles E. Grimes, Minneapolis, Minn., assignor to Toro Manufacturing Corporation, Minneapolis, Minn., a corporation of Minnesota Filed Sept. 8, 1958, Ser. No. 759,494

3 Claims. (Cl. 56—249)

This invention relates to mowers. More particularly it relates to grass mowers having inherent features designed to obviate or substantially reduce the adverse effects caused by bouncing of the machine when moved rapidly over rough terrain.

It is a general object of my invention to provide a novel and improved grass cutting unit which is designed to substantially reduce the adverse effects attendant with bouncing of the machine when the latter is moved over relatively rough terrain at a moderate speed.

A more specific object is to provide a grass cutting unit the parts of which are so constructed and arranged as to successfully dampen out the adverse effects of the tendency of such a machine to bounce while passing over rough terrain.

A still more specific object of my invention is to provide a novel grass cutting unit having a roller mounted thereon in such a manner as to substantially reduce the tendency of such a unit to bounce while passing over rough terrain with consequent irregular cutting patterns.

Another object is to provide a grass cutting unit utilizing a spring-loaded roller wherein the spring loading extends between the frame of the individual cutting unit and a movable mounting for the roller whereby rough terrain may be passed over with the unit with substantially reduced adverse cutting effects as normally experienced with conventional rollers.

These and other objects and advantages of my invention will more fully appear from the following description made in connection with the accompanying drawings wherein like reference characters refer to similar parts throughout the several views and in which:

Fig. 1 is a plan view with parts broken away and shown in section of a grass cutting unit embodying my invention;

Fig. 2 is a rear elevational view of the same;

Fig. 3 is a sectional view on an enlarged scale taken along line 3—3 of Fig. 1; and Fig. 4 is a side elevational view of the same.

One embodiment of my invention is shown in Figs. 1–4 wherein a single grass cutting unit is indicated generally by the numeral 5 and is comprised of a rigid ambulant frame indicated by the numeral 6 which rotatably mounts a pair of wheels 7 and 8 at the forward corners thereof and which is supported at the rear by a roller 9. The frame 6 includes side plates 6a and 6b which support the roller 9 as hereinafter described. The grass cutting unit or mower 5 may include as shown a reel type cutting mechanism 10 which cooperates with a bed bar 11 to effect the cutting operation. The reel 10 is preferably driven by a separate source of rotary power (not shown) or if desired, may be driven through the use of traction wheels in the conventional manner well known in the art.

The roller 9 is rotatably supported at each of its ends by a slotted vertically extending member such as 12 and 13, these members being slotted longitudinally as indicated by the slot 13a. These slots provide means for a vertically adjustable connection with corresponding mounting arms 14 and 15, respectively, the connection thereto being effected through the use of a pair of bolts 16 and 17 which pass through the slot of the corresponding vertical member and the associated mounting arm. When this connection is made, member 13 and mounting arm 15 act as a single connecting member between one end of the roller and the mower frame, and member 12 and mounting arm 14 provide a similar connecting member at the other end of the roller. The roller 9 therefore is capable of free vertical pivoting movement relative to the frame 6 through the pivotal mounting of the mounting arms 14 and 15 at their forward ends upon the side plates 6a and 6b. It will be noted that these mounting arms 14 and 15 extend rearwardly relative to the frame 6, and that portions of members 12 and 13 extend downwardly from said mounting arms.

Each of the mounting arms 14 and 15 is provided with an inwardly extending ear such as 14a as shown in Fig. 3. Each of these ears is provided with a vertically extending opening 14b through which a bolt 19 extends upwardly therethrough. The bolt 19 extends through a laterally extending bar such as 20, 21 which are each rigidly affixed to frame 6. A compression spring such as 22 and 23 is carried by each of the bolts 19 to spring load each of the mounting arms 14 and 15 against the frame of the individual cutting unit.

From the above it can be readily seen that the roller 9 is spring loaded against the frame 6 of each cutting unit so that the roller 9 may move upwardly against the compression of the springs when a stone, obstruction, or rough terrain is encountered by the roller. The roller 9 pivots about its mounting arms 14 and 15 against the compression of the spring so that the frame 6 will not bounce in the ordinary manner normally attendant with grass cutting units whereon the roller is rigidly mounted upon the frame as is conventional in grass mowers. This spring loading and pivotal mounting of the roller 9 tends to substantially reduce the bouncing normally experienced with grass cutting units whereon the mower is rigidly mounted upon the frame of the unit. By substantially reducing the tendency of the grass cutting unit to bounce over rough terrain and moving at a moderate speed, I have greatly reduced the undesirable cutting pattern which is a normal consequence of such bouncing. It should be noted that the compression springs of my grass cutting unit are contained entirely within the individual mowing unit and do not add to the pressure which the roller exerts on the ground due to the weight of the mower as would be the case if the upper ends of the springs were bearing against a vehicle frame or a master frame for a plurality of cutting units. It does permit the roller to fly upwardly quite freely when it strikes a bump, stone or the like and thereby reduces the amount of this motion which is transmitted to the rest of the mower. This results in a more stable ride for the cutting knives of the reel 10 and consequently a smoother cut of the grass.

One advantage of a mower equipped with a spring loaded roller of the type described herein is that it may be coupled to any framework or propelled in any manner and the springs will function to reduce the bouncing tendency. My spring loaded pivotal mounting of the roller permits the roller to bounce but prevents this portion from being transmitted to the rest of the mower and thereby substantially improves the cutting pattern of the mower.

It will, of course, be understood that various changes may be made in the form, details, arrangement and proportions of the parts without departing from the scope of my invention which consists of the matter shown and described herein and set forth in the appended claims.

What is claimed is:

1. A ground roller mechanism adapted for use with a reel type lawn mower, said mechanism comprising a wheeled frame, a pair of spaced mounting brackets, each of said brackets including a rearwardly extending portion pivotally mounted to one side of said frame and a downwardly extending portion, a roller rotatably mounted on said second support members, and resilient means extending between said frame and said mounting brackets continuously urging said roller downwardly, said resilient means and said mounting brackets co-operatively permitting said roller to rise and fall relative to said frame to thereby reduce bouncing of said frame and the mower cutting mechanism as the mower traverses the ground.

2. A ground roller mechanism adapted for use with a reel type lawn mower, said mechanism comprising a wheeled frame, a pair of spaced mounting brackets, each of said brackets including a first support member pivotally mounted at one end to one side of said frame and extending rearwardly therefrom, and a second support member securely attached in a substantially vertical position to the other end of said first member, a roller rotatably mounted on said second support members, and resilient means extending between said frame and said mounting brackets continuously urging said roller downwardly, said resilient means and said mounting brackets co-operatively permitting said roller to rise and fall relative to said frame to thereby reduce bouncing of said frame and the mower cutting mechanism as the mower traverses the ground.

3. A ground roller mechanism as claimed in claim 2, wherein said second support members have axially extending slots formed therein, and additionally comprising securing means extended through said second member slots and into engagement with said first members.

References Cited in the file of this patent

UNITED STATES PATENTS

| | | |
|---|---|---|
| 818,301 | Sayre | Apr. 17, 1906 |
| 1,172,444 | Farmer | Feb. 22, 1916 |
| 1,754,741 | Cobb et al. | Apr. 15, 1930 |
| 2,372,300 | Speiser | Mar. 27, 1945 |
| 2,629,222 | Johnston | Feb. 24, 1953 |